United States Patent [19]

Kitamoto et al.

[11] Patent Number: 4,982,302
[45] Date of Patent: Jan. 1, 1991

[54] MAGNETIC RECORDING MEDIUM AND METHOD FOR MAGNETIC RECORDING AND REPRODUCTION

[75] Inventors: Tatsuji Kitamoto; Koji Sasazawa, both of Kanagawa; Hotaka Minaguchi; Hiromichi Shibaya, both of Tokyo, all of Japan

[73] Assignees: Fuji Photo Film Co., Ltd., Kanagawa; Japan Broadcasting Corporation, Tokyo, both of Japan

[21] Appl. No.: 179,352

[22] Filed: Apr. 8, 1988

[30] Foreign Application Priority Data

Apr. 8, 1987 [JP] Japan ................................ 62-84676

[51] Int. Cl.$^5$ ........................... G11B 5/78; G11B 5/02
[52] U.S. Cl. ........................................ 360/134; 360/59
[58] Field of Search ...................... 360/59, 134; 369/13

[56] References Cited

U.S. PATENT DOCUMENTS 4,340,914 7/1982 Hanaoka ................................ 360/59
4,712,203 12/1987 Saito et al. ............................ 360/59

Primary Examiner—Vincent P. Canney
Attorney, Agent, or Firm—Sughrue, Mion, Zinn, MacPeak & Seas

[57] ABSTRACT

A method for magnetic recording and reproduction comprising the steps of: (1) magnetically multiple-recording signals on a magnetic recording medium comprising a support having thereon an upper magnetic recording layer comprising barium ferrite having an increased coercive force at 60° C. or more and a lower magnetic recording layer comprising at least one of chromium dioxide and Co-modified iron oxide, having a decreased coercive force at 60° C. or more, disposed between said upper magnetic recording layer and said support; (2) heating said magnetic recording layers prior to reproduction due to a reproducing head; and (3) reproducing said magnetically recorded signal from said heated magnetic recording medium which is multiple-recorded.

4 Claims, 2 Drawing Sheets

TAPE TRANSPORT DIRECTION

TAPE TRANSPORT DIRECTION

MAGNETIC RECORDING MEDIUM AND METHOD FOR MAGNETIC RECORDING AND REPRODUCTION

FIELD OF THE INVENTION

The present invention relates to a multi-layered magnetic recording medium suitable for multiple recording signals. The present invention also relates to a method for performing magnetic recording and reproduction using the multi-layered magnetic recording medium.

BACKGROUND OF THE INVENTION

Many attempts have been made to achieve higher density magnetic recording. One approach is to employ multiple recording in video applications. For instance, a luminance signal, a chroma signal, an audio signal and other signals are recorded on the same surface of media such as VTR's and video floppy disks for home use. In magnetic recording, different signals can be recorded in two layers, one being on top of the other, and two layered media have been proposed. However, the magnetic field of signals for reproduction (i.e., playback) receives a contribution from the magnetization of both the upper and lower layers, and the two cannot be magnetically differentiated from each other. To overcome this problem, different signal frequency bands are separated with a filter.

If multiple magnetic recording is performed on separated signal frequency bands, the following problem occurs. If the signals to be recorded are two modulation signals having different carrier frequencies, $f_1$ and $f_2$ ($f_2 > f_1$), unwanted components (spurious components) corresponding to the sum of, or difference between, integral multiples of $f_1$ and $f_2$ will be reproduced on account of the nonlinear characteristics of distortion including the head and tape. If the recording current $i_R$ is expressed as $i_1 \sin 2\pi f_1 t + i_2 \sin 2\pi f_2 t$, the reproduced output, ep is proportional to $i_R + k i_R^3$. Of the term proportional to $i_R^3$, spurious components that occur in the signal bands are $i_1^2 i_2 \sin 2\pi(f_2 - 2f_1)t$, $i_1^3 \sin 2\pi(3f_1)t$, etc.

Home use VTR's currently available on the market perform recording by FM modulating a luminance signal with $f_2$ and by AM modulating a chroma signal with $f_1$. The frequency profile of the reproduced signal components and the spurious components is shown in FIG. 1. In today's home use VTRs, the recording current for $f_1$ component is limited to such an extent that the spurious components occurring in the reproduced luminance signal will not cause any substantial deleterious effects. More specifically, the recording level of carrier $f_1$ in the output of a reproduced amplifier is set at a value such that the level of $(f_2 - 2f_1)$ component is not more than $-22$ dB compared with the output level of carrier $f_2$. This approach, however, has the disadvantage of a low SN ratio for the chroma signal.

SUMMARY OF THE INVENTION

An object, therefore, of the present invention is to reduce the spurious components in order to overcome the disadvantage of prior art magnetic recording media.

Extensive studies have been conducted in order to attain this object, using magnetic materials showing different playback output characteristics depending on temperature. On the basis of these studies, the present inventors succeeded in reducing spurious components by using a magnetic recording medium having a dual-layered structure in which two magnetic materials having different characteristics are formed in two layers.

In one aspect, the present invention relates to A magnetic recording medium comprising a support having thereon an upper magnetic recording layer comprising barium ferrite having an increased coercive force at 60° C. or more and a lower magnetic recording layer comprising a magnetic material selected from chromium dioxide and Co-modified iron oxide and mixture thereof, having a decreased coercive force at 60° C. or more, disposed between said upper magnetic layer and said support.

In another aspect, the present invention relates to a method for magnetic recording and reproduction by the steps of:

(1) Magnetically multiple-recording signals on a magnetic recording medium containing a support having an upper magnetic recording layer containing barium ferrite having an increased coercive force at 60° C. or more and a lower magnetic recording layer containing at least one of chrominum dioxide or a Co-modified iron oxide having a decreased coercive force at 60° C. or more, disposed between the upper magnetic recording layer and the support;

(2) Heating the manetic recording medium prior to reproduction due to a reproducing head; and (3) Reproducing magnetically recorded signals from the magnetic recording medium which is multiple-recorded.

DETAILED DESCRIPTION OF THE INVENTION

The present invention is hereinafter described in detail.

Figure 1:
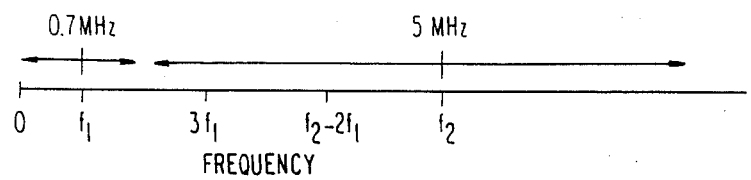
FIG. 1 is a diagram showing an illustrative frequency profile of reproduced signal component and spurious components.
Figure 2:
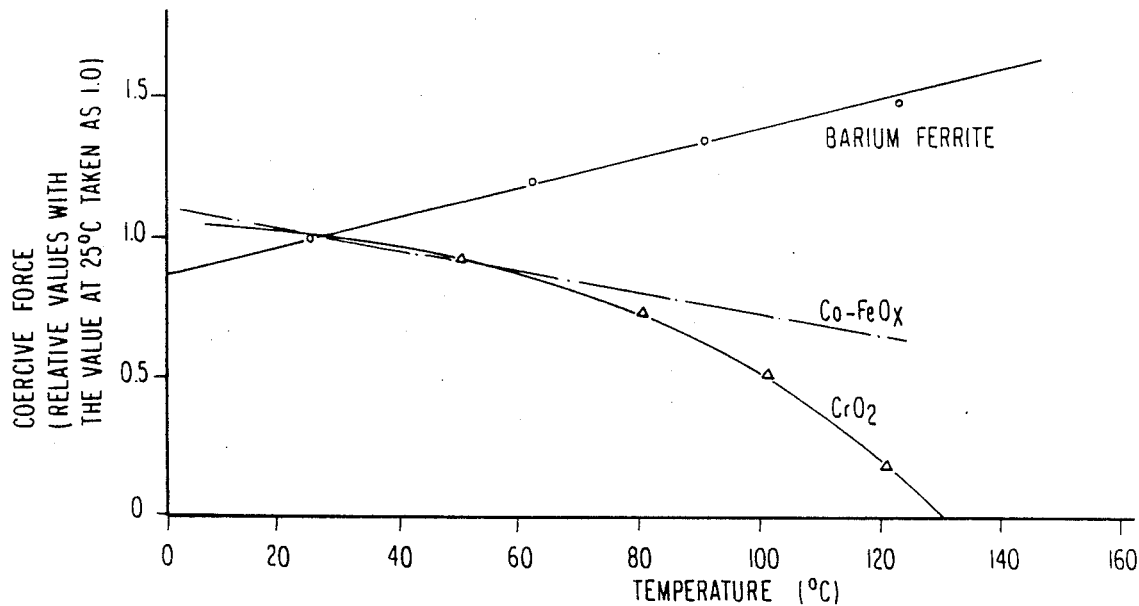
FIG. 2 is a graph showing the coercive forces of three different magnetic materials depending on temperature.
Figure 3:
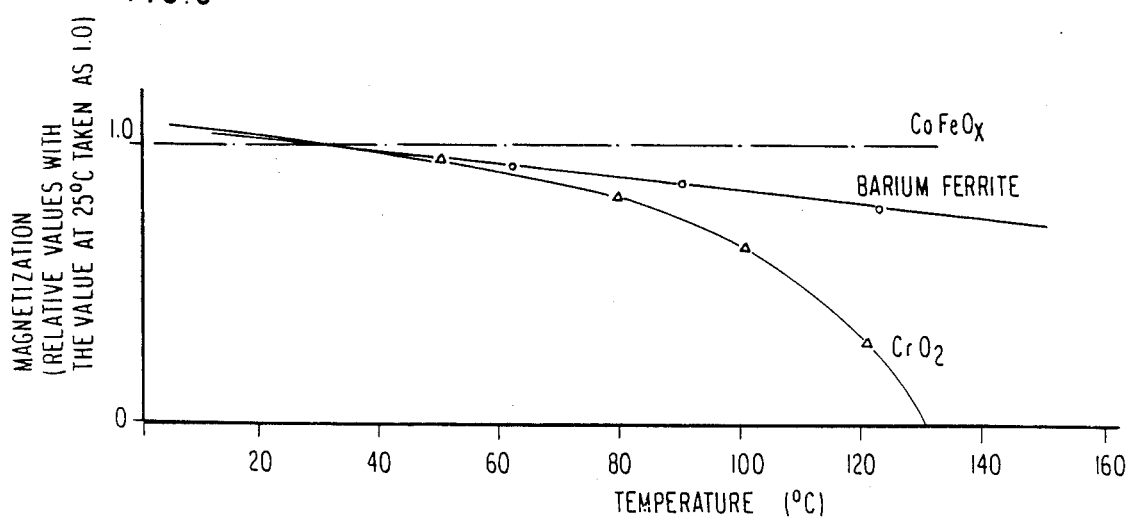
FIG. 3 is a graph showing the magnetization of three different magnetic materials depending on temperature.

In the two-layered magnetic recording medium of the present invention, the upper magnetic layer contains barium ferrite (hereinafter abbreviated as Ba-ferrite) having an increased coercive force at 60° C. or more as a magnetic material and the lower layer contains either a Co-modified iron oxide (Co—FeO$_x$ (wherein $1.33 < X \leq 1.50$)) or a chromium dioxide (CrO$_2$) or mixture thereof, having a decreased coercive force at 60° C. or more. The coercive force vs. temperature characteristics of these three magnetic materials are shown in FIG. 2, and the magnetization vs. temperatures characteristics of the same magnetic materials are shown in FIG. 3. Other magnetic materials such as $\gamma$-Fe$_2$O$_3$, particle of ferromagnetic iron alloys, and oblique-evaporated films of Co-Ni systems are scarcely sensitive to temperature and hence are not suitable for use in the present invention.

If the magnetic recording medium of the present invention is passed across a first head to record the component $f_1$ in the lower frequency range, then across a second head to record the component $f_2$ in the higher frequency range, component $f_1$ is recorded on the lower magnetic layer of the medium and component $f_2$ on the upper layer. In view of the characteristics shown in FIGS. 2 and 3, the output produced by the second head after heating the medium during the reproduction contains a reduced proportion of component $f_1$ and, hence, the proportion of the spurious component in component $f_2$ is also reduced. If component $f_1$ is decreased by 10 dB, the spurious ($f_2 - 2f_1$) component proportional to the square of component $f_1$ is reduced by 20 dB whereas component $3f_1$ proportional to the cube of $f_1$ is decreased by 30 dB.

The multi-strucure of the magnetic recording layer in the medium of the present invention is described below more specifically. The upper magnetic layer of the medium contains Ba-ferrite as a magnetic material. A suitable Ba-ferrite can be prepared by adjusting the coercive force to a value preferably from about 300 to 2,500 Oe, more preferably from about 600 to 2,000 Oe, through substituting with an appropriate element such as Co or titanium as described in U.S. Pat. No. 4,341,648. The practical upper limit of about 2,500 Oe is set in consideration of the maximum value that can be recorded with magnetic heads made of currently available magnetic materials such as Sendust alloy and amorphous alloys. Barium ferrites having higher coercive values may be employed if recording is performed at sufficiently low temperatures to reduce the coercive force or if the magnetic head is made of improved materials. The lower limit of about 300 Oe is determined because, for the objects of the present invention, it is desirable that the media have a coercive force that is not lower than the value attained by video cassette tapes which have been extensively used as magnetic tapes capable of high density recording.

The magnetic material to be used in the lower magnetic layer is preferably Co-FeO$_x$ (wherein $1.33 < X \leq 1.50$) or CrO$_2$ which experience changes in coercive force depending on temperature inverse to the change occurring in Ba-ferrite. A preferred material is CrO$_2$ which also experiences a great change in magnetization depending on temperature. The magnetic material used in the lower magnetic layer has a coercive force in the range of generally from about 300 to 1,500 Oe, preferably from about 300 to 1,000 Oe, and more preferably from about 500 to 1000 Oe. If the thickness of the upper layer exceeds about 2 μm, the lower limit of the coercive force of the magnetic material used in the lower magnetic layer may be within the range of from about 300 to 500 Oe in consideration of the decrease in the strength of the magnetic field created by the recording head. In the dual magnetic recording layer structure, the upper layer preferably makes up at most about half of the overall magnetic layer thickness, and an upper-layer thickness of about 2 μm or less (preferably from about 0.1 to 1.0 μm) is particularly preferred for the purpose of high density recording. That is, the ratio of the thickness of the upper layer to the thickness of the lower layer is 1 or less. The lower layer, therefore, makes up half or more of the overall thickness. The sum of the thickness of the upper and lower layer is generally about 5 μm but a thinner magnetic layer may of course be employed. That is preferably the sum of the thicknesses of the upper and lower layer is from about 0.2 to 5.0

The magnetic recording medium of the present invention can be fabricated by the following process according to methods for preparing a multi-layered magnetic recording medium as described in Japanese Patent Application (OPI) Nos. 212933/87 and 27410/78, methods for preparing a magnetic coating solution as described in Japanese Patent Publication No. 26890/81, and methods for coating the magnetic coating solution as described in Japanese Patent Application (OPI) Nos. 10912/83 and 111476 (the term "OPI" as used herein means an "unexamined and published Japanese Patent Application). First, CrO$_2$ and/or Co—FeO$_x$ dispersed in a suitable binder and dissolved in an organic solvent together with optional additives is coated on a non-magnetic base film support to form a lower magnetic recording layer. Simultaneously with, or separately from, this step, an upper magnetic recording layer is formed in a similar manner. After forming the magnetic coatings, the web is passed through the necessary conventional stages of fabrication such as orientation in a magnetic field, drying, calendering for producing a smooth surface, and slitting to a predetermined width.

For performing magnetic recording and reproduction with the magnetic recording medium of the present invention, a magnetic head is used that has a sufficient magnetizing force to match the coercive force of the recording medium. With ordinary heads composed of ferritic compounds, recording can be accomplished on magnetic recording media that have coercive forces of up to about 1,000 Oe at a depth of about 1 μm or less from the surface, and from about 800 to 900 Oe at a depth of more than about 1 μm from the surface. For use with magnetic recording media having even greater coercive forces, magnetic heads made of Sendust alloys, amorphous alloys or thin metal films have been developed. For example, a head made of a Sendust alloy is capable of recording on magnetic media that have coercive forces of up to about 2,000 Oe at a depth of about 1 μm or less the surface, and up to about 1,600 Oe at a depth of more than about 1 μm. It should, however, be noted that these values are by no means intended to limit the scope of the present invention, since even higher values could be realized by exploiting improvements in magnetic head technology.

Figure 4:
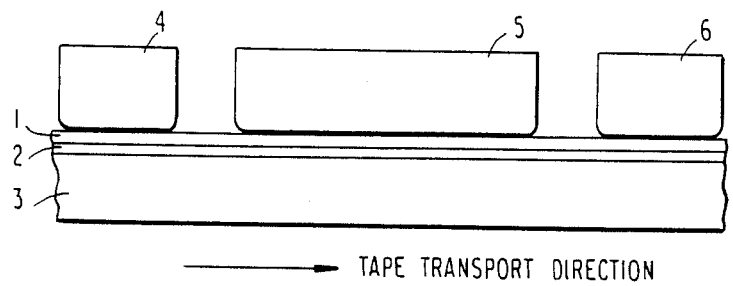
FIG. 4 is a schematic representation of a signal reproducing apparatus.

An apparatus for reproducing signals with the magnetic recording medium of the present invention is shown diagrammatically in FIG. 4. In FIG. 4, a magnetic recording medium having an upper magnetic recording layer 1 and a lower magnetic recording layer 2 formed on a support 3 is passed across a first magnetic reproducing (i.e., playback) head 4, then across heating means 5 for heating the magnetic recording layers 1 and 2, and finally across a second magnetic reproducing head 6. The arrow in FIG. 4 indicates the direction of tape transport relative to the heads and heating means. The members 4, 5 and 6 may be moved simultaneously in a direction opposite to the tape transport direction. The heating means 5 may be in the form of a heater block to be heated by electricity or some other suitable form of energy. Heating may also be effected by any known method, such as irradiation of thermal rays, infrared rays or laser beams. The function of the heating means 5 is to cause a substantial increase in the temperature of the magnetic recording layers 1 and 2 when they are present between the heads 4 and 6. For the purposes of the present invention, the heating means preferably achieves an increase of the order of from about 10 to 100° C. and particularly from about 50° to 100° C. in the temperature of the magnetic recording medium. If the heating means is a heater block, it is suitably heated to a temperature in the range of generally from 50° to 150° C., and preferably from about 70° to 130° C. As a result of this heating action, the output from the Ba-ferrite layer remains substantially constant because any slight decrease in the output due to decreased magnetization is compensated for by the increase in the coercive force of Ba-ferrite. Notably, the output from the Ba-ferrite will drop by only a negligible degree during high density recording.

In the lower magnetic recording layer containing Co-FeO$_x$ or CrO$_2$, the output drops by about 2 to 6 decibels (usually about 2 to 3 dB) on account of the decrease in coercive force caused by temperature elevation. If CrO$_2$ is heated to 100° C. or more, the output drops is at least about 10 dB. In the case of CrO$_2$, the output decreases on account of reduced magnetization, and this is independent of the recording density. These variations in output due to temperature elevation are uniquely determined depending on the composition of the medium, the magnetic material used, its coercive force, the thickness of magnetic recording layers, and the temperature at which the magnetic recording medium is heated.

EXAMPLE

Figure 5:
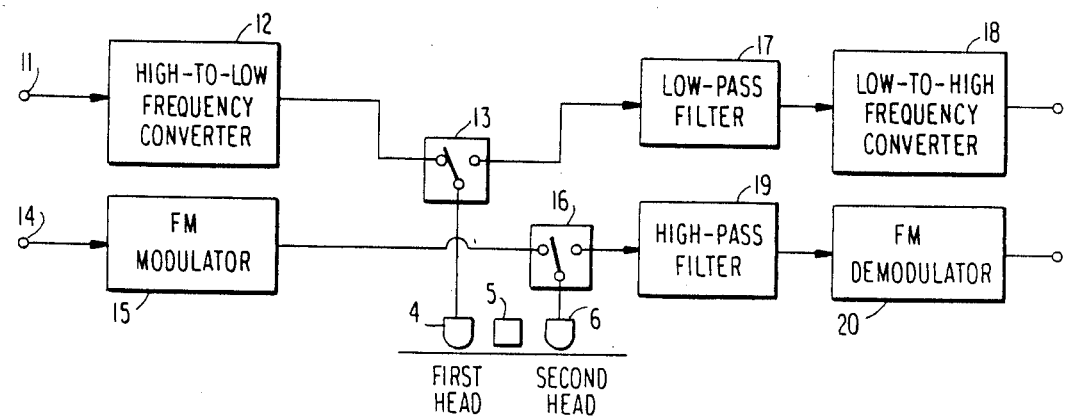
FIG. 5 is a block diagram illustrating magnetic recording and reproduction according to one embodiment of the present invention.

Magnetic recording and reproducing to be performed in accordance with one embodiment of the present invention is now described in greater detail with reference to FIG. 5, but this specific illustration is not to be construed as limiting the scope of the present invention.

A color subcarrier signal supplied at an input terminal 11 is passed through a high-to-low frequency converter circuit 12 so as to convert the signal frequency to carrier frequency $f_1$. The output from the converter 12 is combined with a high frequency bias signal and applied to a first head 4 through a two-position switch 13, thereby effecting bias recording on the magnetic recording layers 1 and 2. A chrominance signal is supplied at another input terminal 14 and FM-modulated in an FM modulator circuit 15 with a carrier frequency $f_2$. The output from the modulator 15 is applied to a second head 6 through a two-position switch 16 for recording on the tape. As a result, the output from the converter 12 is recorded on the lower layer of the tape whereas the output from the modulator 15 is recorded on the upper layer.

In a reproduction (playback) mode, the respective contacts of switches 13 and 16 are brought to the reproduction position. The output from the first head 4 is passed through a low pass filter 17 so as to remove the component $f_2$ and any spurious component. Thereafter, the output is supplied to a low-to-high frequency converter circuit 18 so as to restore the original color subcarrier signal. The tape is heated by passage across a heater 5 and the second head 6 picks up a signal containing attenuated low frequency and spurious components. The output from the second head 6 is passed through a high pass filter 19 so as to remove component $f_1$ and is subsequently passed through an FM demodulator circuit 20 to reproduce the signal.

In accordance with the present invention, the spurious components that disadvantageously affect conventional magnetic recording can be appreciably reduced and the recording level of component $f_1$ is sufficiently increased to ensure reproduction of that component at a significantly better S/N ratio.

While the invention has been described in detail and with reference to specific embodiments thereof, it will be apparent to one skilled in the art that various changes and modifications can be made therein without departing from the spirit and scope thereof.

What is claimed is:

1. A method for magnetic recording and reproduction comrpising the steps of:
    (1) magnetically different layers of recording signals on a magnetic recording medium comprising a support having thereon an upper magnetic recording layer comprising barium ferrite having an increased coercive force at 60° C. or more and a lower magnetic recording layer comprising at least one of chromium dioxide and Co-modified iron oxide having a decreased coercive force at 60° C. or more, disposed between said upper magnetic recording layer and said support;
    (2) heating said magnetic recording layers prior to reproduction due to a reproducing head; and
    (3) reproducing said magnetically recorded signals from said heated magnetic recording medium which is multiple-recorded.

2. The method as claimed in claim 1, further comprising the steps of:
    (1) recording a signal $f_1$ in at least said lower magentic layer;
    (2) subsequently recording a signal $f_2$ having a higher frequency range than said signal $f_1$ in at least said upper magnetic layer;
    (3) reproducing said magnetically recorded signal $f_1$ in a first reproducing step;
    (4) subsequently heating said magnetic recording layers; and
    (5) reproducing said magnetically recorded signal $f_2$ in a second reproducing step.

3. The method as claimed in claim 1, wherein heating step the temperature of said magnetic recording layers is increased by a temperature in a range from about 10° to 100° C.

4. The method as claimed in claim 1, wherein the heating means are selected from the group consisting of irradiation of thermal rays, irradiation of infrared rays, or irradiation of laser beams.

* * * * *